(12) United States Patent
Baenziger et al.

(10) Patent No.: US 7,567,008 B2
(45) Date of Patent: Jul. 28, 2009

(54) ROTATING ELECTRICAL MACHINE AND METHOD FOR PRODUCING SUCH A MACHINE

(75) Inventors: Matthias Baenziger, Fislisbach (CH); Werner Ladstaetter, Baden-Daettwil (CH); Francesco Stallone, Locarno (CH)

(73) Assignee: ALSTOM Technology Ltd., Baden (CH)

( * ) Notice: Subject to any disclaimer, the term of this patent is extended or adjusted under 35 U.S.C. 154(b) by 346 days.

(21) Appl. No.: 11/623,405

(22) Filed: Jan. 16, 2007

(65) Prior Publication Data

US 2007/0170793 A1 Jul. 26, 2007

(30) Foreign Application Priority Data

Jan. 24, 2006 (CH) ............................ 00107/06

(51) Int. Cl.
*H02K 17/00* (2006.01)
(52) U.S. Cl. .................. 310/201; 310/71; 310/260; 310/180
(58) Field of Classification Search ............ 310/71, 310/201–209, 179–184, 260, 254, 261
See application file for complete search history.

(56) References Cited

U.S. PATENT DOCUMENTS

| | | | |
|---|---|---|---|
| 1,329,242 A | | 1/1920 | Hellmund |
| 3,344,296 A | * | 9/1967 | Coggeshall et al. .......... 310/260 |
| 3,435,517 A | * | 4/1969 | Fortenbach et al. ........... 29/596 |
| 3,648,091 A | * | 3/1972 | Kostin et al. ................ 310/260 |
| 3,991,334 A | * | 11/1976 | Cooper et al. ............... 310/260 |
| 4,054,809 A | | 10/1977 | Jefferies |

(Continued)

FOREIGN PATENT DOCUMENTS

DE 19619727 11/1997

(Continued)

OTHER PUBLICATIONS

Search Report for Swiss Patent App. No. 0107/2006 (Jan. 24, 2006).

(Continued)

*Primary Examiner*—Thanh Lam
(74) *Attorney, Agent, or Firm*—Cermak Kenealy Vaidya & Nakajima LLP; Adam J. Cermak

(57) ABSTRACT

A rotating electrical machine (10) has a rotor (11), which rotates about an axis (13) and is surrounded concentrically by a stator (12) having a stator winding (30) inserted into a stator body (21), the stator winding (30) including, in a concentric arrangement, a lower layer (16), which is more remote from the axis, and an upper layer (17), which is closer to the axis, of axially extending winding bars (14), which emerge from the stator body (21) at the ends of the stator (12) and are arranged, within an end winding (15), with their bar ends (23), on two concentric circles in pairs one above the other in the radial direction. With such a machine, simplified production of the stator winding (30) with, at the same time, a high dielectric strength is achieved by virtue of the fact that in those winding bars (14) of a pair which belong to different phases within a phase segregation, radial spreading (18) of the bar ends (23) is provided so as to increase the radial distance between the different phases.

15 Claims, 4 Drawing Sheets

U.S. PATENT DOCUMENTS

| | | | | |
|---|---|---|---|---|
| 4,238,339 A | * | 12/1980 | Khutoretsky et al. | 310/260 |
| 4,318,021 A | * | 3/1982 | Johansson et al. | 310/260 |
| 4,385,254 A | | 5/1983 | Vakser et al. | |
| 4,563,607 A | * | 1/1986 | Cooper et al. | 310/260 |
| 4,698,533 A | * | 10/1987 | Kindig et al. | 310/71 |
| 4,782,579 A | * | 11/1988 | Rowe et al. | 29/596 |
| 4,800,314 A | * | 1/1989 | Ward et al. | 310/260 |
| 5,140,740 A | * | 8/1992 | Weigelt | 29/596 |
| 5,717,267 A | | 2/1998 | Paroz | |

FOREIGN PATENT DOCUMENTS

| | | |
|---|---|---|
| DE | 19726563 | 12/1998 |
| DE | 10215937 | 10/2003 |
| EP | 0713281 | 5/1996 |
| EP | 0899851 | 3/1999 |
| GB | 1395461 | 5/1975 |

OTHER PUBLICATIONS

Search Report for European Patent App. No. 07100386.7 (May 7, 2007).

* cited by examiner

ROTATING ELECTRICAL MACHINE AND METHOD FOR PRODUCING SUCH A MACHINE

This application claims priority under 35 U.S.C. § 119 to Swiss patent application number 00107/06, filed 24 Jan. 2006, the entirety of which is incorporated by reference herein.

BACKGROUND OF THE INVENTION

1. Field of the Invention

The present invention relates to the field of electrical machines. It relates to a rotating electrical machine and to a method for producing such a machine.

2. Brief Description of the Related Art

Such machines are known, for example, from DE-A1-197 26 563 or DE-A1-102 15 937.

In large rotating electrical machines, such as turbogenerators, for example, in a power range of up to several 100 MW, the stator winding is constructed by winding bars having a rectangular cross section, which are inserted and wedged into axial slots provided for this purpose in the laminate stack. Two winding bars are often arranged one above the other in a lower layer and in an upper layer within the slots (see, for example, the aforementioned DE-A1-197 26 563). The winding bars of the lower layer and upper layer emerge from the stator body at both ends and are each connected to one another or to terminals for the stator winding in an end winding with a predetermined scheme so as to form the stator winding. For this purpose, the winding bars are bent outwards, outside the stator body, by a fixed angle such that they lie, with their end sections, on a cone about the machine axis. At the same time, the end sections are bent (twisted) on the cone casing transversely with respect to the axis in order to bring, in accordance with the scheme, a winding bar from the lower layer of one slot and a winding bar from the upper layer of another slot together at the ends such that they lie one above the other in pairs on concentric circles and can be connected directly to one another.

With selected pairs of bar ends, which belong to different phases of the stator winding, no connection is produced. Instead, the bar ends, which lie one above the other, are connected separately to terminals of the machine for the stator winding (see FIG. 3 in DE-A1-197 26 563). Since the full voltage may be present between the two bar ends of such a phase segregation pair, particular precautions need to be taken in order to ensure the required dielectric strength in this region. One of these precautions, which has been suggested and has proven successful in practice, consists in spreading the bar ends, which initially lie directly one above the other, of the upper layer and lower layer tangentially on the cone of the end winding, i.e., bending them laterally apart from one another in opposite directions.

However, this precaution has the following disadvantages: while all the winding bars of the upper and lower layers have the same "pitch" or twisting angle in the end winding without any tangential spreading, for each tangential spreading two winding bars with a different pitch need to be produced. In addition, it may be necessary for a different pitch to be provided for a winding bar pair which is adjacent to the phase segregation pair in order to provide space for the tangential spreading. In practice, this means considerable additional complexity when producing the winding bars.

SUMMARY OF THE INVENTION

One of numerous aspects of the present invention involves providing a rotating electrical machine in which a high dielectric strength, given reduced complexity in the production of the winding bars, is achieved in the phase segregation of the stator winding, and a method for its production.

Another aspect of the present invention includes that, in the phase segregation, radial spreading of the bar ends is provided so as to increase the radial distance and therefore the dielectric strength between the different phases. Owing to the radial spreading, the pitch or the twisting angle in the end winding can be made the same for all winding bars and therefore production can be simplified.

One exemplary configuration of the invention is characterized by the fact that the radial spreading is brought about by an edgewise bend at the bar end of the winding bars of a pair, the winding bars of a pair running substantially parallel to one another within the end winding, and that the radial spreading is brought about by an edgewise bend, which leads away from the other winding bar, at the bar end of one of the winding bars of a pair.

One development of this configuration is characterized by the fact that the winding bars lie, within the end winding, on a coaxial cone, which can be opened towards the outside, and that the winding bar, which belongs to the upper layer, of a phase segregation pair is aligned axially at the bar end by the edgewise bend.

In particular, the opening angle of the cone and the bending angle of the edgewise bend may be approximately 20°.

Advantageously, the rotating electrical machine is a high-power generator having a power of a few hundred megawatts.

In the method according to the invention, prior to the production of the connection between the bar end and the phase connection and, in particular, prior to the fitting of the lug, in a first step the phase segregation cap is drawn so far over the bar end or over the phase connection that it is not damaged when the connection is subsequently soldered; in a second step, the connection between the bar end and the phase connection is produced incorporating the lug; and, in a third step, the phase segregation cap is pushed over the connection region.

One exemplary embodiment of the method according to the invention is characterized by the fact that a phase segregation cap having a permanently elastic material is used which has slightly smaller nominal dimensions than the outer contours of the connection region.

One alternative configuration is characterized by the fact that a phase segregation cap including a shrinking material is used, and that the phase segregation cap is shrunk in a fourth step once it has been pushed over the connection region.

BRIEF DESCRIPTION OF THE DRAWING FIGURES

The invention will be illustrated in more detail below with reference to exemplary embodiments in connection with the drawings, in which.

DETAILED DESCRIPTION OF EXEMPLARY EMBODIMENTS

Figure 1:
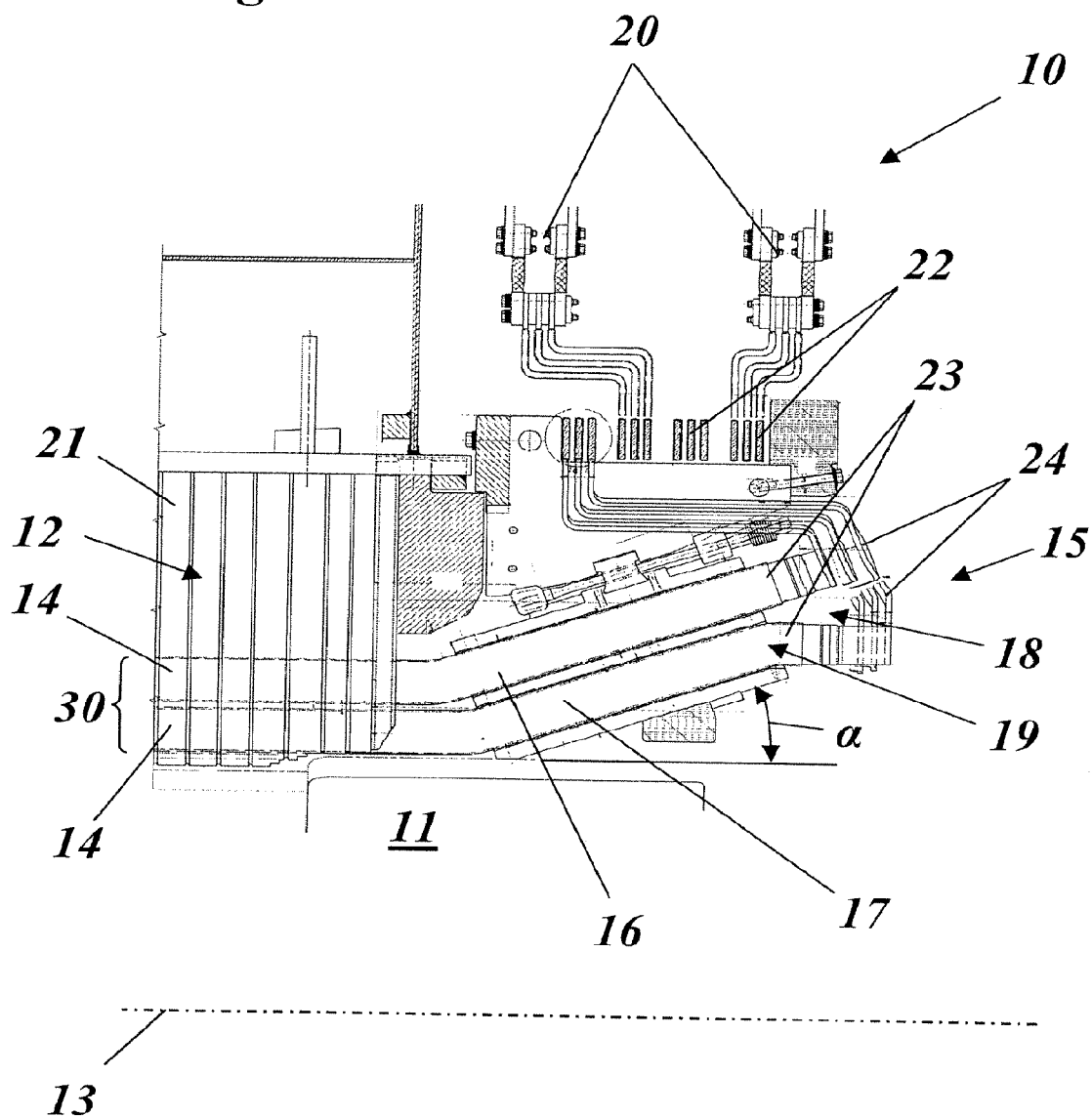
FIG. 1 shows a longitudinal section through the connection-side end winding of an electrical machine in accordance with one exemplary embodiment of the invention.

FIG. 1 illustrates, in longitudinal section, the connection-side end winding 15 of a rotating electrical machine 10 in accordance with one exemplary embodiment of the invention. The machine 10 has a rotor 11 (only indicated by the contour), which rotates about an axis 13 and is surrounded concentrically by a stator 12. The stator 12 comprises a stator body 21 in the form of a laminate stack, into which slots are introduced on the inner circumference for the purpose of accommodating the stator winding 30 formed from winding bars 14. Two winding bars 14 are arranged one above the other in each slot, these winding bars belonging to a lower layer 16 and an upper layer 17 of the stator winding 30.

Figure 2:
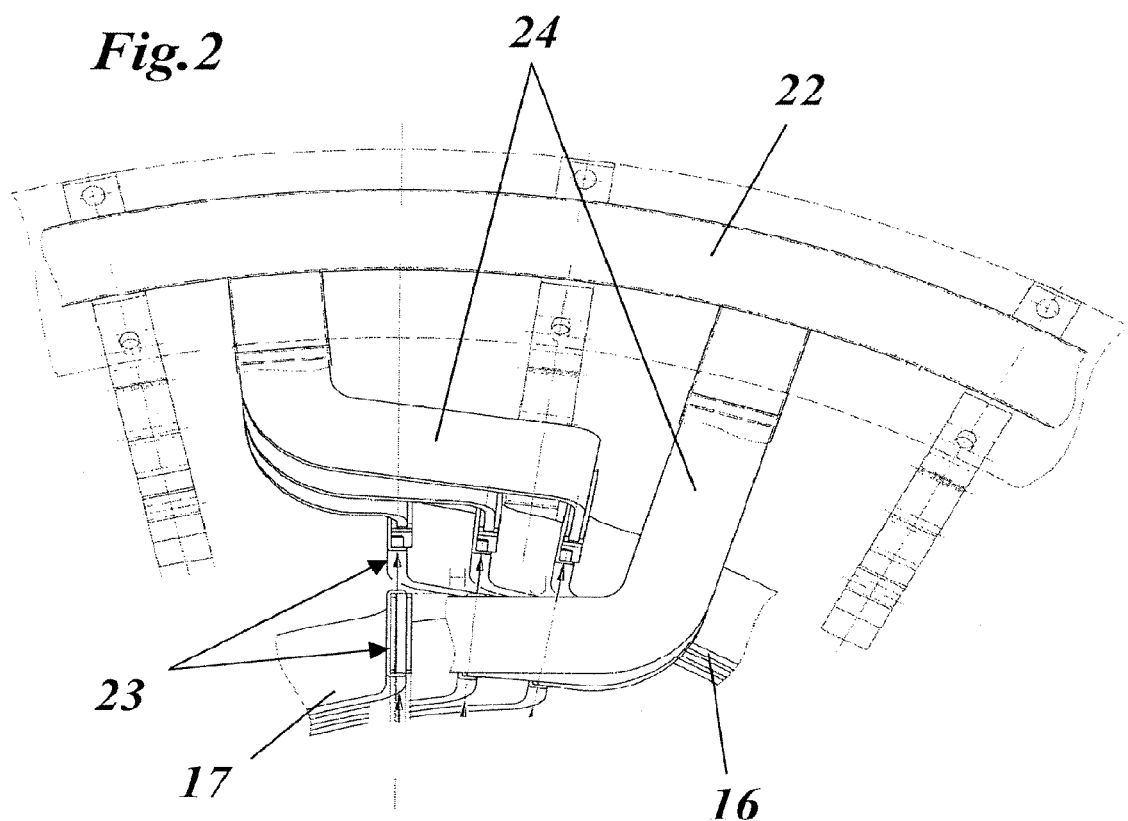
FIG. 2 shows a plan view, in the axial direction, of the region of the phase segregation in the end winding shown in FIG. 1.

The winding bars 14 of both layers 16, 17 emerge from the stator body 21 with their end sections and are bent outwards within the end winding 15 such that the end sections lie on a cone about the axis 13 with a cone angle α. At the same time, twisting of the end sections about a constant twisting angle takes place in opposite directions on the casing surface of the cone in order to arrange the bar ends 23 of the winding bars 14 from the upper and lower layer 17 and 16, respectively, which lie in different slots, on concentric circles about the axis 13 in accordance with a predetermined scheme in pairs one above the other. FIG. 2 shows three pairs of bar ends 23 from the upper layer 17 and the lower layer 16 next to one another, which are connected, within a phase segregation, separately to corresponding terminals 20 (FIG. 1) of the machine via phase connections 24 and rings 22.

In order to achieve a greater distance between the different phases, i.e., between the bar ends of the two winding bars 14 of a pair, in the connection or outgoing line terminals in the phase segregation, the bar end 23 of the winding bar 14 from the upper layer 17 is bent, in the opposite direction to the cone angle α, with an edgewise bend 19 (FIG. 1) into the horizontal position (i.e., axially parallel). Owing to the edgewise bend 19 before the bar end and the associated radial spreading 18, it is possible to dispense with tangential spreading of the phase segregation even at high voltages. The wide variety of bar variants can therefore be reduced. One further advantage of this geometry is the improved accessibility for installation work such as soldering, reinsulation of the phase connections and the interface.

With the radial spreading it is also possible, under tight spatial conditions, to achieve a greater distance between the winding bars or phase connection terminals of different phases and therefore to achieve a high rated voltage in the case of generators with a compact design.

Figure 3:
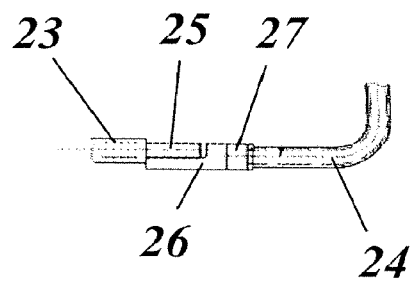
FIG. 3 shows, in a plan view, a typical connection between the bar end and the phase connection within the phase segregation.
Figure 5:
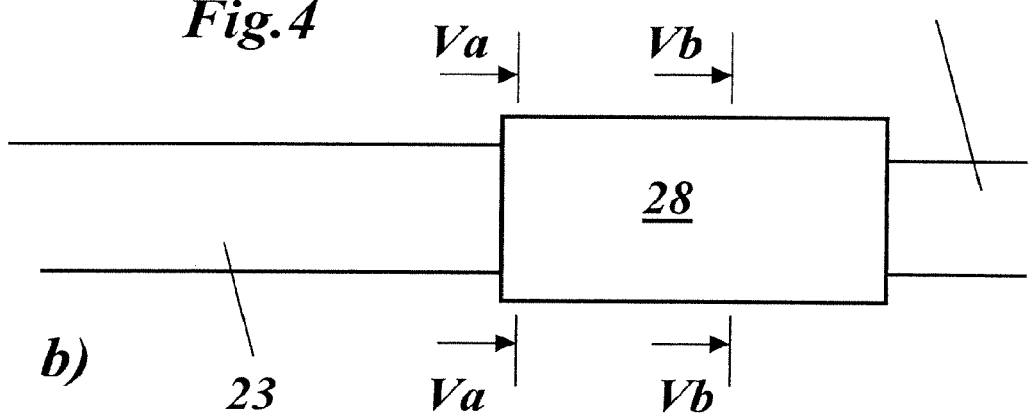
FIG. 5 shows, in two subfigures (FIGS. 5a and b), two cross sections through the insulated connection shown in FIG. 4b.
Figure 5:
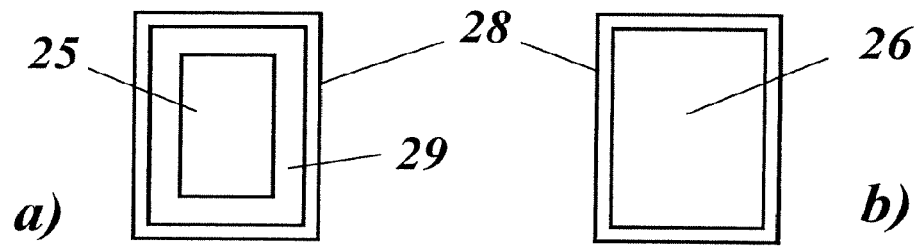

Closely associated with the spreading of the bar ends in the phase segregation is the insulation of the connections which exist between the bar ends of different phases and the connected phase connections (round connections). A typical connection is illustrated in FIG. 3, in a plan view: the insulation (29 in FIG. 5a) is removed at the bar end 23 over a certain length, with the result that the conductor 25 is exposed. A specially shaped lug 26 consisting of copper is soldered flat to the exposed conductor 25, the free end of which lug is adjoined by a matching piece 27 (likewise consisting of copper). A matching cutout in the matching piece 27 accommodates the conductor 25, from which the insulation has been removed, of the phase connection 24.

Figure 6:
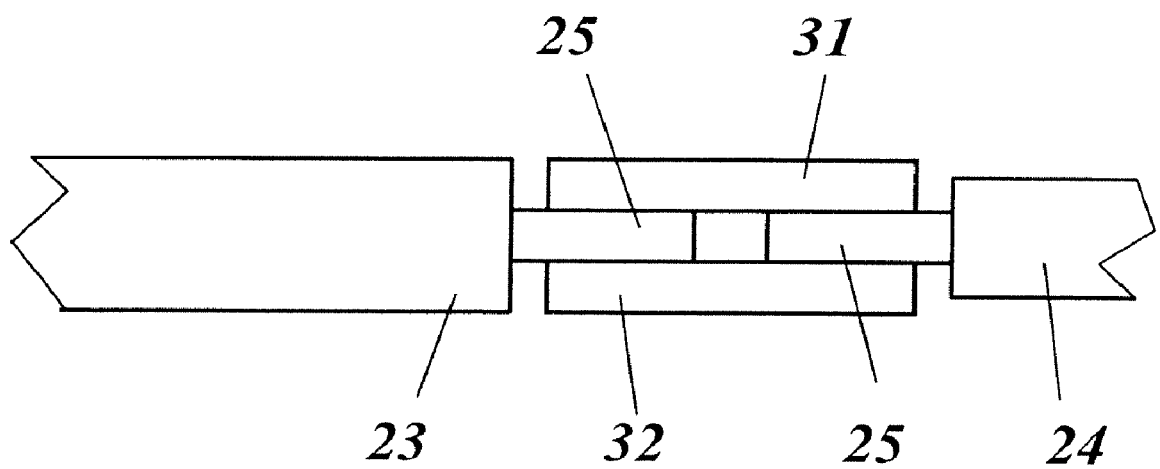
FIG. 6 shows an alternative form of the connection to that in FIG. 4 between the conductors by means of two parallel plates.

An alternative configuration of the connection is reproduced in FIG. 6. Here, the two conductors 25 of the bar end 23 and the phase connection 24 are connected from two sides by means of two parallel plates 31, 32.

Within the connection illustrated in FIG. 3, the conductor 25, the lug 26, and the matching piece 27 are exposed as metallic parts and need to be insulated. In the past, phase segregation caps which can be plugged on one side (EP-A1-0 899 851) and impregnable nonwoven caps fixed with sleeves (EP-B1-0 713 281) have already been proposed for insulating two bar ends, which are connected to one another, outside the phase segregation. The nonwoven caps require a complex impregnation step. The phase segregation caps which can be plugged on laterally have the following disadvantages:

open, hand-laminated caps which are produced individually are expensive.
  It is necessary to use filling cement.
  The caps have a large wall thickness and therefore poor heat transfer.
  The caps can be dismantled in the case of repair or analysis only with considerable complexity.

Figure 4:
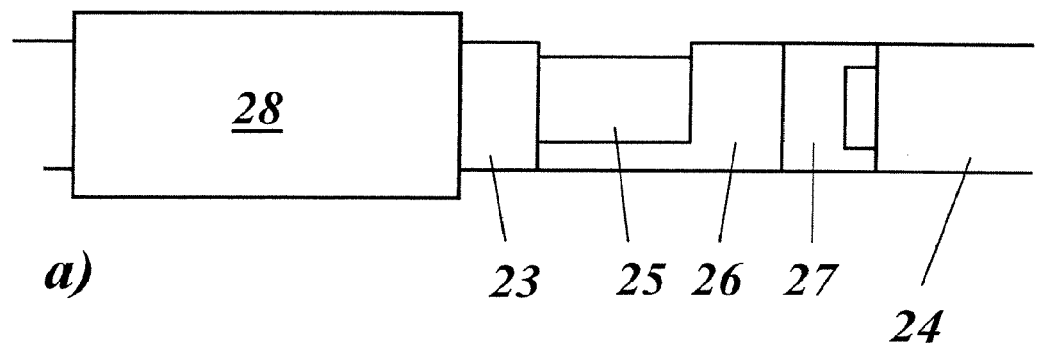
FIG. 4 shows, in two subfigures (FIGS. 4a and b), two steps in the production of the phase connection in accordance with the invention.

As shown in FIGS. 4a, b and 5a, b, an improvement can in this case take place if a phase segregation cap 28 is used which can be drawn over. The following basic preconditions are necessary in order that the phase segregation cap, which can be drawn over, can be realized:

predominantly axial connection of the phase connections to the winding or bar ends.
  Slim design of the lugs 26, which, when bare, have approximately the width and height of the insulated winding bars 14 or the phase connection 24.

The associated method is as follows: before the lugs 26 are fitted, the phase segregation caps 28 in the form of sleeves are drawn over the bar end 23 or the phase connection 24 and placed so far removed that they cannot be damaged during soldering (FIG. 4a). Once the connection 24, 25, 26, 27 has been produced, the phase segregation cap 28 is pushed over the connection region.

The material of the phase segregation cap 28 may either include a permanently elastic and thermally resistant silicone material and have slightly smaller nominal dimensions than the outer contours of the lugs 26 and the insulation 29, or else it consists essentially of polyester or a similarly shrinking material which, after being pushed back onto the bare part by means of a hot blower, adapts cleanly to the real geometry. In both cases, the phase segregation cap conforms tightly to the outer contour in the connection region and thus effectively assists the dielectric strength achieved by the radial spreading.

LIST OF REFERENCE SYMBOLS

10 Electrical machine
11 Rotor
12 Stator
13 Axis
14 Winding bar
15 End winding
16 Lower layer (winding)

17 Upper layer (winding)
18 Spreading (radial)
19 Edgewise bend
20 Terminal
21 Stator body (laminate stack)
22 Ring
23 Bar end
24 Phase connection
25 Conductor (winding bar)
26 Lug
27 Matching piece
28 Phase segregation cap (in the form of a sleeve)
29 Insulation
30 Stator winding
31, 32 Plate
α Cone angle While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A rotating electrical machine comprising:
   a stator having ends, a stator body, and a stator winding inserted in the stator body;
   a rotor which rotates about an axis and is surrounded concentrically by the stator;
   wherein the stator winding comprises, in a concentric arrangement, a lower layer which is more remote from the axis, and an upper layer which is closer to the axis, of axially extending winding bars which emerge from the stator body at the ends of the stator, the winding bars being arranged, within an end winding, with their bar ends on two concentric circles in pairs one above the other in the radial direction; and
   wherein in winding bars of a pair which belong to different phases within a phase segregation, the bar ends are radially spread to increase the radial distance between the different phases.

2. The machine as claimed in claim 1, wherein the radial spread includes an edgewise bend at the bar end of the winding bars of a pair.

3. The machine as claimed in claim 2, wherein the winding bars of a pair run substantially parallel to one another within the end winding, and wherein the radial spread includes an edgewise bend which leads away from the other winding bar of said pair, at the bar end of one of the winding bars of said pair.

4. The machine as claimed in claim 3, wherein the winding bars lie, within the end winding, on a coaxial cone which opens outwardly, and wherein the winding bar which belongs to the upper layer of a phase segregation pair is aligned axially at the bar end by the edgewise bend.

5. The machine as claimed in claim 4, wherein an opening angle (α) of the cone and a bending angle of the edgewise bend are approximately 20°.

6. The machine as claimed in claim 1, wherein the rotating electrical machine comprises a high-power generator having a power of a few hundred megawatts.

7. The machine as claimed in claim 1, further comprising:
   lugs, wherein the radially spread bar ends are connected to a phase connection via the lugs, the lugs being arranged between the bar ends; and
   insulated phase segregation caps comprising sleeves, wherein a connection region between the phase connection and the bar end is in each case surrounded by one of said insulating phase segregation caps.

8. The machine as claimed in claim 7, wherein the phase segregation cap comprises a shrink tube which tightly surrounds the connection region between the phase connection and the bar end.

9. The machine as claimed in claim 7, wherein the phase segregation cap comprises a permanently elastic and thermally resistant silicone material.

10. The machine as claimed in claim 7, wherein the phase segregation cap consists essentially of polyester.

11. A method for producing a machine, the method Comprising:
    in a first step, providing a rotating electrical machine as claimed in claim 7;
    in a second step, drawing the phase segregation cap so far over the bar end or over the phase connection that the cap is not damaged when a connection is subsequently soldered;
    in a third step, forming a connection between the bar end and the phase connection; and
    in a fourth step, pushing the phase segregation cap over the connection region.

12. The method as claimed in claim 11, wherein the phase segregation cap comprises a permanently elastic material which has slightly smaller nominal dimensions than the outer contours of the connection region.

13. The method as claimed in claim 11, wherein the phase segregation cap comprises a shrinking material, and further comprising:
    shrinking the phase segregation cap in a fourth step after the cap has been pushed over the connection region.

14. The machine as claimed in claim 7, further comprising:
    wherein the lugs are soldered between the bar ends.

15. A method as claimed in claim 11, wherein forming a connection between the bar end and the phase connection comprises fitting a lug.

* * * * *